(12) United States Patent
Garcia (10) Patent No.: US 7,416,128 B2
(45) Date of Patent: Aug. 26, 2008

(54) METHODS AND SYSTEMS FOR DETERMINING THE POSITION OF A HAND-HELD OBJECT FROM THE ACCELERATION OF THE HAND-HELD OBJECT

(75) Inventor: Philip Garcia, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 390 days.

(21) Appl. No.: 11/086,123

(22) Filed: Mar. 22, 2005

(65) Prior Publication Data

US 2006/0214908 A1    Sep. 28, 2006

(51) Int. Cl.
*G06K 7/10* (2006.01)

(52) U.S. Cl. .................. 235/472.01; 345/179
(58) Field of Classification Search .............. 235/472.01–472.03; 345/179
See application file for complete search history.

(56) References Cited

U.S. PATENT DOCUMENTS 4,787,051 A  *  11/1988  Olson ......................... 345/179
5,902,968 A  *   5/1999  Sato et al. ................. 178/19.01

* cited by examiner

*Primary Examiner*—Jamara A Franklin (57) ABSTRACT

Embodiments of the invention relate to determining the position of a hand-held object from the acceleration of the hand-held object. In an embodiment, a measure of the displacement of the hand-held object is derived in part from a measure of an acceleration of the hand-held object. A measure of a position of the hand-held object is generated based on the displacement of the hand-held object, and is output.

31 Claims, 7 Drawing Sheets

METHODS AND SYSTEMS FOR DETERMINING THE POSITION OF A HAND-HELD OBJECT FROM THE ACCELERATION OF THE HAND-HELD OBJECT

TECHNICAL FIELD

Embodiments of the present invention pertain to methods and systems for determining the position of a hand-held object from the acceleration of the object.

BACKGROUND ART

A data input device such as a mouse includes a mechanism that tracks the movement of the mouse. The movement of the mouse is used to position an on-screen indicator (e.g., a cursor) as is desired by a mouse user. However, many conventional data input systems are not equipped to support cutting edge applications, such as graphics applications, that require three-dimensional tracking of the input device in order to position a three dimensional on-screen indicator among other shortcomings.

A conventional mouse can include a metal or plastic housing or casing and a ball that sticks out of the bottom of the casing. The mouse can be rolled on a flat surface, and can have one or more buttons on the top of the casing, and a cable that connects the mouse to a computer. As the ball is moved over the surface in any direction, a rotary sensor (electromechanical transducer) sends impulses to the computer that causes a mouse-responsive program to reposition an on-screen indicator (e.g., a cursor) on a display screen. The positioning is generally relative to some variable starting place. By noting the current position of the cursor on the display screen, a user can readjust the position of the on-screen indicator with precision by moving the mouse.

An optical mouse uses a light-emitting diode, an optical sensor, and digital signal processor (DSP) in place of the conventional mouse ball and electromechanical transducer discussed above. Movement is detected by sensing changes in reflected light, rather than by interpreting the motion of a rolling sphere.

The optical mouse takes microscopic snapshots of the surface upon which the mouse is positioned at a rate of more than 1,000 images per second. When the mouse is moved, the image of the surface changes. The tiniest irregularities in the surface can produce images that enable the sensor and DSP to generate usable movement data. The best surfaces reflect but scatter light, such as for example, a blank sheet of white drawing paper.

Conventional mouse systems have many shortcomings that are traceable to their aforementioned reliance on the use of mechanical balls and rotary sensors or optical pickups to determine position. Those devices that employ mechanical balls and rotary sensors invariably have moving parts that require cleaning. Moreover, devices that rely on optics require special surfaces in order for them to function properly. It should be appreciated that some surfaces do not permit the proper functioning of the sensor and DSP because the irregularities in the surfaces are too small to be detected, e.g., unfrosted glass. In addition, as discussed above, many conventional devices do not support cutting edge applications, such as graphics applications, that require three-dimensional tracking of the input device to position a three-dimensional on screen indicator.

DISCLOSURE OF THE INVENTION

Embodiments of the invention relate to determining the position of a hand-held object from the acceleration of the hand-held object. In an embodiment, a measure of the displacement of the hand-held object is derived in part from a measure of an acceleration of the hand-held object. A measure of a position of the hand-held object is generated based on the displacement of the hand-held object, and is output.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

For purposes of the discussion to follow the term "position" is intended to refer to a one, two or three-dimensional position. Moreover, the terms "acceleration", "velocity" and "displacement" are intended to refer to a one, two or three-dimensional "acceleration", "velocity" or "displacement" respectively. It should be appreciated that the accelerometers referred to herein are of the type that produce a voltage that is proportional to acceleration as is well known in the art.

EXEMPLARY SYSTEM FOR DETERMINING THE POSITION OF A HAND HELD OBJECT ACCORDING TO AN EMBODIMENT OF THE PRESENT INVENTION

Figure 1:
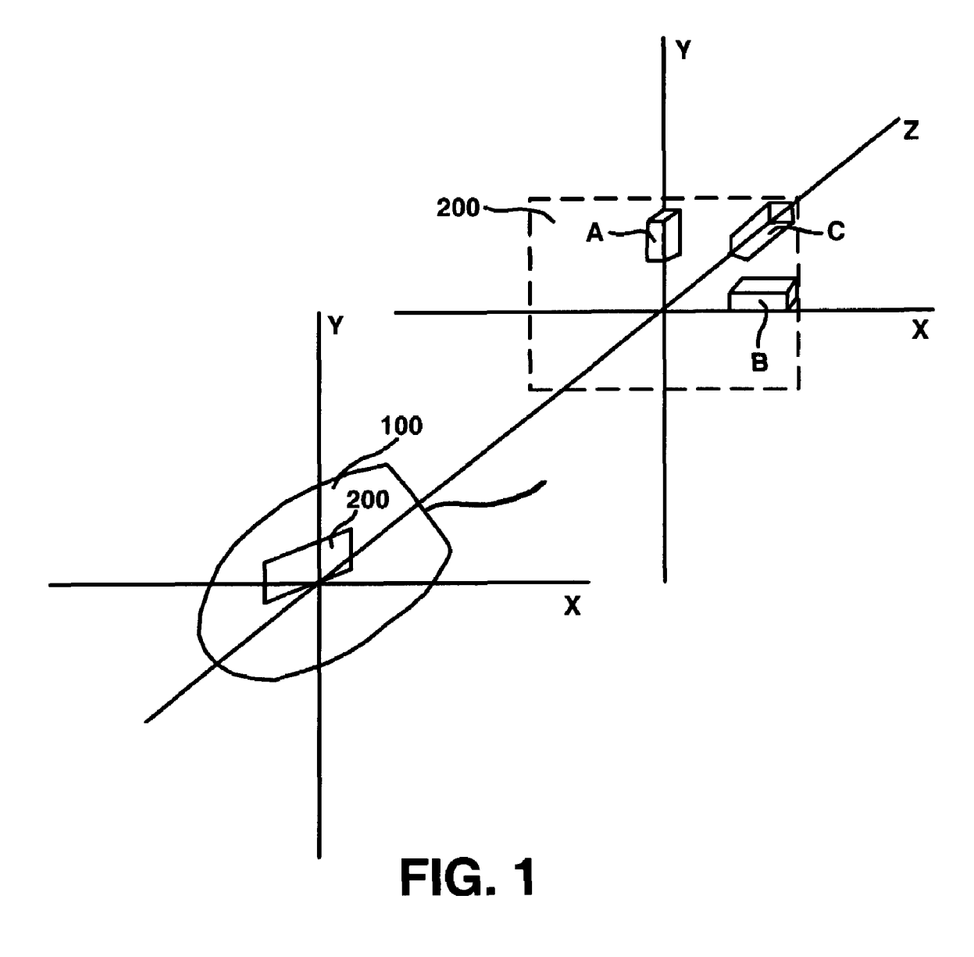
FIG. 1 shows a hand-held object that includes a system for determining the position of an object based on the acceleration of the object according to an embodiment of the present invention.

FIG. 1 shows a hand-held object 100 that includes a system 200 for determining the position of the hand-held object 100 based on the acceleration of the hand-held object 100 according to an embodiment of the present invention. The embodiment of FIG. 1 includes hand-held object 100 depicted in FIG. 1 as a mouse, system 200 for determining the position of a hand-held object, and accelerometers A, B and C.

As noted above, in the FIG. 1 embodiment, hand-held object 100 is depicted as a mouse that includes a system 200 for determining the position of the hand-held object 100. In an embodiment, system 200 derives the position of the hand-held object 100 from the acceleration of the hand-held object 100.

In an embodiment, one or more accelerometers, such as A and/or, B and/or C in FIG. 1, can be employed in the system 200 as a means of generating an output voltage or voltages that is proportional to an acceleration of hand-held object 100 in one or more directions such as X and/or Y and/or Z directions shown in FIG. 1. In an embodiment, the accelerometers can be oriented to provide a measure of the acceleration of hand-held object 100 in one, two or three-dimensional space. It should be appreciated that the output voltage or voltages that are generated and that provide a measure of the acceleration of hand-held object 100 in one or more directions can be subsequently integrated to provide a measure of the velocity of hand-held object 100 in one or more directions.

In an embodiment, if only one accelerometer is used, one or two-dimensional accelerations can be determined as a single accelerometer can be configured to provide a measure of acceleration in at least two directions. If two or three accelerometers are employed, then two or three-dimensional accelerations can be determined.

Moreover, in an embodiment, the output measure of velocity can be integrated to produce a measure of the displacement of the hand-held object 100. A measure of the final position of the hand-held object 100 can be determined by adding the measure of the displacement of the hand-held object 100 to a measure of the initial position of the hand-held object 100. It should be appreciated that the integrations can be performed using hardware or software or a combination of hardware and software. In an embodiment, the output voltages can vary with time.

In an embodiment, the information provided by system 200 for determining the position of a hand-held object 100 can be used by a hand-held object 100 responsive program application to control movement of a graphical depiction of a pointing device, e.g., such as a 2D mouse or a 3D virtual reality glove. In other embodiments, such information can be used for other purposes, for example, authenticating signatures, tracking movements of an optical pen, character recognition, etc.

Figure 2A:
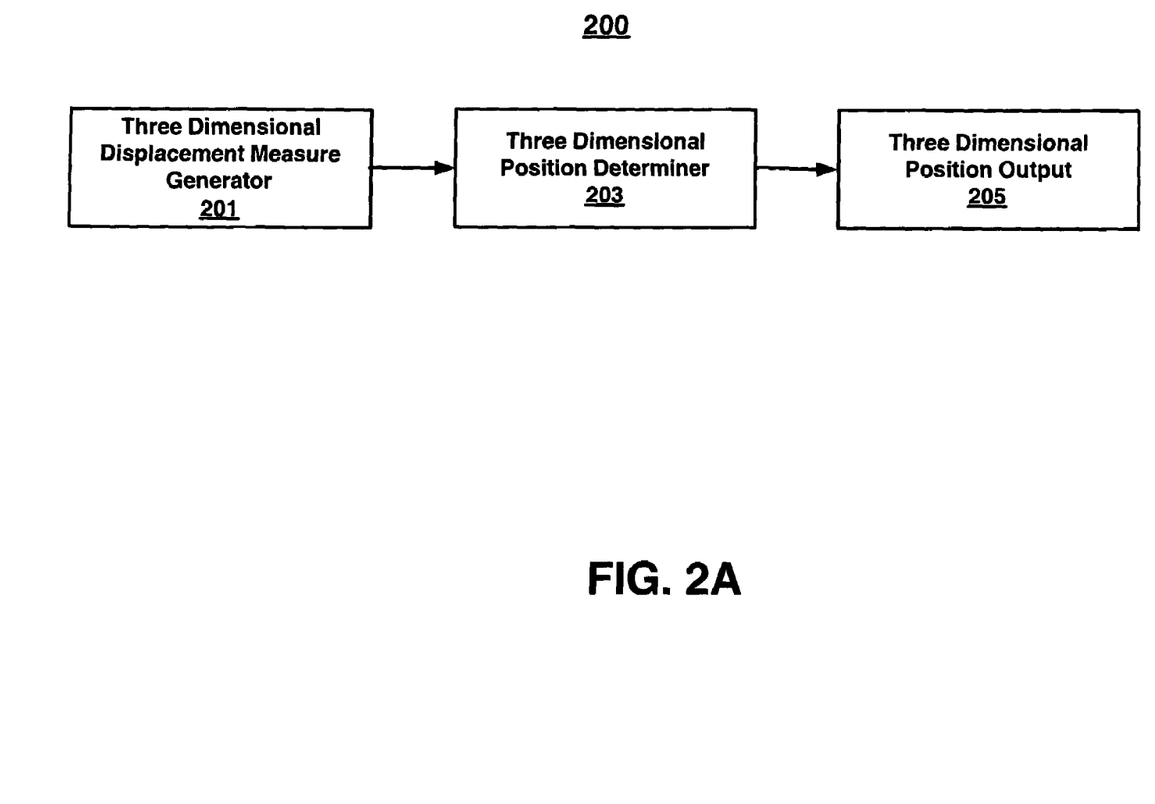
FIG. 2A shows a system for determining the position of an object based on the acceleration of the object according to an embodiment of the present invention.

FIG. 2A shows components of a system 200 for determining the position of a hand-held object, for example hand-held object 100 in FIG. 1, according to an embodiment of the present invention. The FIG. 2A embodiment of system 200 includes displacement measure generator 201, position determiner 203, and position measure output 205.

Displacement measure generator 201 generates a measure of the displacement of an object. It should be appreciated that the measure of the displacement of the object can include displacement along one, two or three axes (see FIG. 1).

In an embodiment, displacement measure generator 201 generates a measure of the displacement of the hand-held object and includes operations such as: (1) generating a measure of the acceleration of the hand-held object, (2) integrating the measure of the acceleration of the hand-held object to produce a measure of a velocity of the hand-held object, and (3) integrating the measure of the velocity of the hand-held object to obtain a measure of the displacement of the hand-held object.

In an embodiment, as discussed above, the generation of a measure of the acceleration of a hand-held object can be performed by one, two or three accelerometers. In an embodiment, where more than one accelerometer is employed, the accelerometers can be orthogonally oriented.

In an embodiment, the integration of the measure of acceleration and the integration of the measure of velocity that is involved in the generation of a measure of the displacement of an object by displacement measure generator 201 can be performed by software such as an application that computes the area under a curve that represents object acceleration or velocity to determine object velocity or displacement respectively and/or by hardware for example such as an op amp integrator that receives an input voltage that represents object acceleration or velocity and outputs a voltage that represents object velocity or displacement respectively.

Figure 2B:
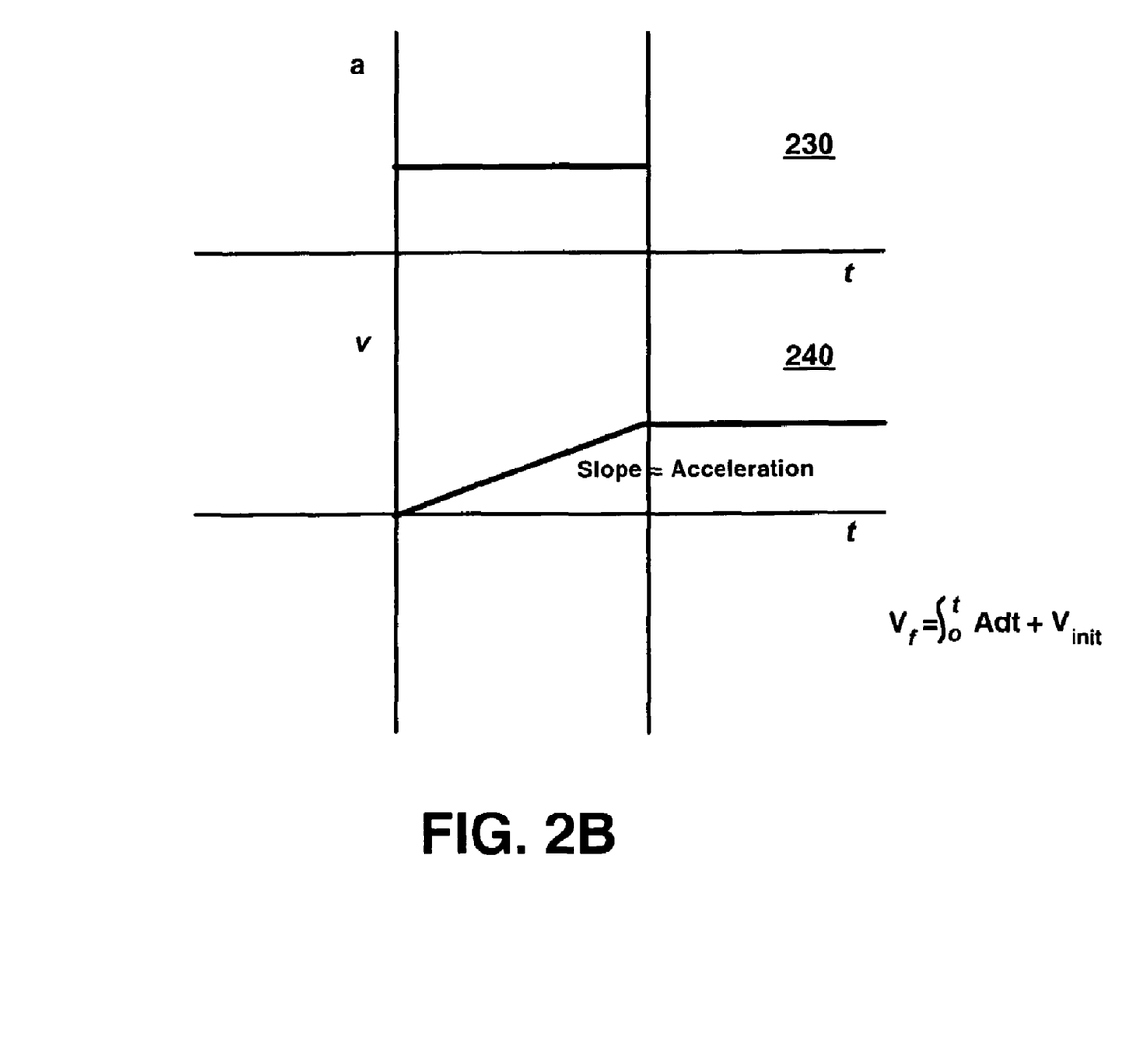
FIG. 2B shows exemplary graphs of acceleration versus time and velocity versus time that correspond respectively to a measure of an acceleration of a hand-held object and a measure of the velocity of the hand-held object according to an embodiment of the present invention.
Figure 2C:
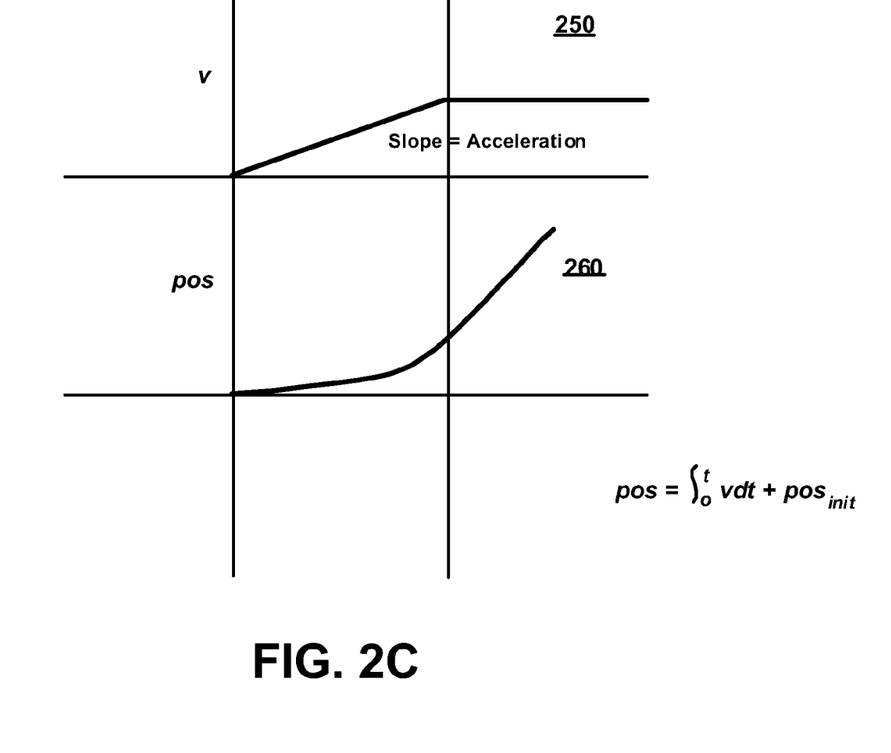
FIG. 2C shows exemplary graphs of velocity versus time and position versus time that correspond respectively to a measure of a velocity of a hand-held object and a measure of the position of the hand-held object according to an embodiment of the present invention.

FIGS. 2B and 2C graphically characterize operations that are performed as a part of the displacement measure generating functionality of the displacement measure generator 201.

FIG. 2B shows exemplary graphs 230 and 240 of acceleration versus time and velocity versus time that correspond respectively to a measure of an acceleration of a hand-held object and a measure of the velocity of the hand-held object according to an embodiment of the present invention. In an embodiment, as discussed above, a measure of an acceleration of a hand-held object can be integrated such as by components of displacement generator 201 to obtain a measure of the final velocity of the hand-held object. In an embodiment this can be accomplished when a measure of the "change in" velocity of the hand-held object is added to the initial velocity of the hand-held object. Referring to FIG. 2B, given a hand-held object with acceleration A, the measure of the final velocity of the hand-held object is given by the equation:

$$V_f = \int_0^t A dt + Vinit$$

where $V_f$ represents the final velocity of the object, A represents the acceleration of the object, $\int_0^t A dt$ represents the "change in" velocity of the object due to acceleration and Vinit represents the initial velocity of the object.

Moreover, FIG. 2C shows exemplary graphs 250 and 260 of velocity versus time and displacement versus time that correspond respectively to a measure of the velocity of an object and a measure of the displacement of the object according to an embodiment of the present invention. In an embodiment, the velocity of an object can be integrated, such as by components of displacement generator 201, to obtain a measure of the displacement of the object. In an embodiment, a measure of the final position of the object can be obtained by adding measure of the displacement of the object to a measure of the initial position of the object. Referring to FIG. 2C, given an object with velocity V, the measure of the final position of the object is given by the equation:

$$p = \int_0^t V dt + pinit$$

where p represents the final position of the object, V represents the velocity of the object, $\int_0^t V dt$ represents the displacement of the object and pinit represents the initial position of the object.

Referring again to FIG. 2A, the measure of the displacement of an object that is generated by displacement measure generator 201 can be performed by one, two or three displacement measure generating mechanisms. In an embodiment, these displacement measure generating mechanisms can include one, two or three accelerometers such as are shown in FIG. 1 in addition to an integrator system for performing the aforementioned integrations involved in determining displacement.

Position determiner 203 determines the position of an object. Position determiner 203 determines the position of the object based on the displacement of the object and on the starting position pinit of the object. In an embodiment this is accomplished by adding the displacement of the object to the initial position of the object as described above. In an embodiment, an addition of the displacement of the object to the initial position of the object represents vector additions in 1, 2 or 3 dimensional space.

Position measure output 205 outputs voltages that are measures of the position of an object.

Figure 3:
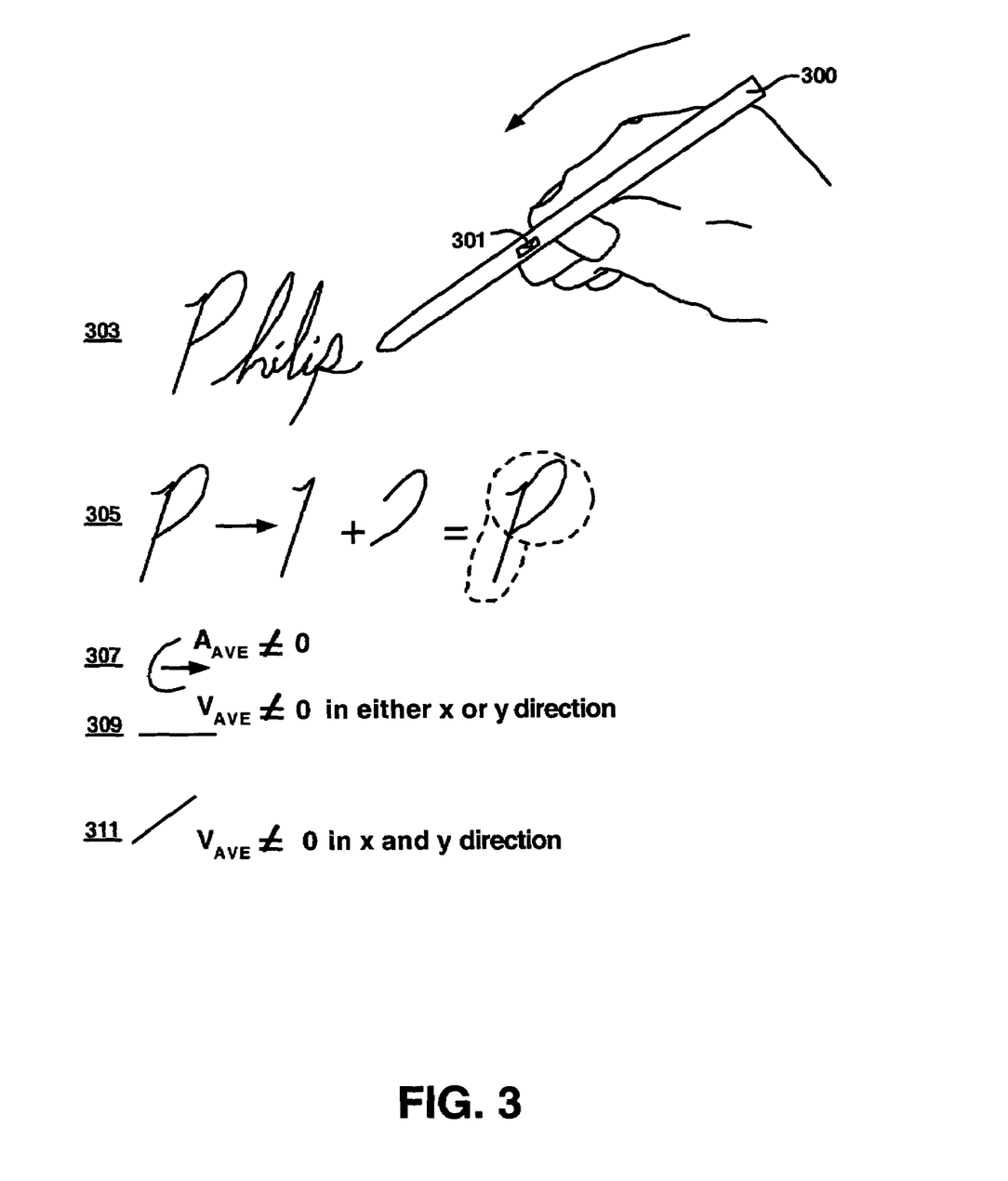
FIG. 3 illustrates a system for authenticating signatures that includes a system for determining the acceleration of a hand-held object that is used to make the signatures in a plane or surface in three-dimensional space according to an embodiment of the present invention.

FIG. 3 illustrates a system for authenticating signatures that includes a system for determining the acceleration of a hand-held object such as a writing instrument that is used to make the signatures according to an embodiment of the present invention.

In an embodiment of the present invention, a system 300 for determining the acceleration of a writing instrument such as a pen, pencil, etc., can reside in writing instrument 301 (both 300 and 301 refer to "writing instrument". In an embodiment, the average accelerations involved in making the strokes that form a signature can be determined using system 300 for determining the acceleration of a writing instrument and subsequently recorded. This record of average accelerations can be maintained and cross-referenced to an identifier of the individual to whom the signature belongs.

FIG. 3 shows a cursive signature of the name "Philip" at 303. FIG. 3 illustrates how the letter "P" in the cursive signature of the name "Philip" can be decomposed in a manner that isolates the strokes that form the letter "P" at 305. In an embodiment, each of the letters in the cursive signature can be decomposed in this manner into their component strokes. The average accelerations ($A_{AVE}$) at 307 involved in completing each of the component strokes can be thus be determined.

In an embodiment, the average accelerations involved in completing the strokes in each of the letters that are a part of a signature are associated together and can be stored and later compared with the average accelerations associated with a signature that is presented. In an embodiment, this information can provide a mechanism for additional and more rigorous authentication of the signature. As previously mentioned, this information can be cross-referenced to an identifier of the individual to whom the signature belongs. At some later point in time when a signature is presented as being that of the individual, the signature that is presented can be authenticated using the information that is stored.

It should be appreciated that a static comparison of signatures by matching the shapes of letters can be fooled particularly when a copy of the original signature has been obtained, studied and practiced. A dynamic comparison matching not only the shapes but also the accelerations and velocities of the creation of the associated shapes insures that the compared shapes/letters were created in the same manner/speed as the original signer created them. Therefore, an additional more rigorous level of authentication is provided which could not be defeated without knowing how the original signer actually dynamically created his signature and not just by obtaining a static copy of the signature.

In an embodiment character recognition can be performed using the measured acceleration and velocity of written strokes/letters. Further, the unique characteristics of a stroke can be used to identify the stroke. For example, a straight line stroke has an average velocity that is non-zero and an average acceleration that is zero. Moreover, if a stroke has an average velocity that is non-zero in the x or y direction, then the line can be identified as straight, and if a stroke has an average velocity that is non-zero in the x and y directions then the line can be identified as being slanted.

FIG. 3 items 307-311 illustrate unique characteristics of particular strokes. For example, at 307 a non-zero average acceleration indicates a concave stroke(the arrow indicates the direction of the average acceleration), at 309 a non-zero average velocity in the x or y direction indicates a straight line (x for horizontal and y for vertical) and at 311 a non-zero average velocity in both the x and y directions indicates a slanted line. In an embodiment, using such knowledge regarding the unique characteristics of particular strokes character recognition can be performed effectively.

EXEMPLARY OPERATIONS ACCORDING TO EMBODIMENTS OF THE PRESENT INVENTION

Figure 4:
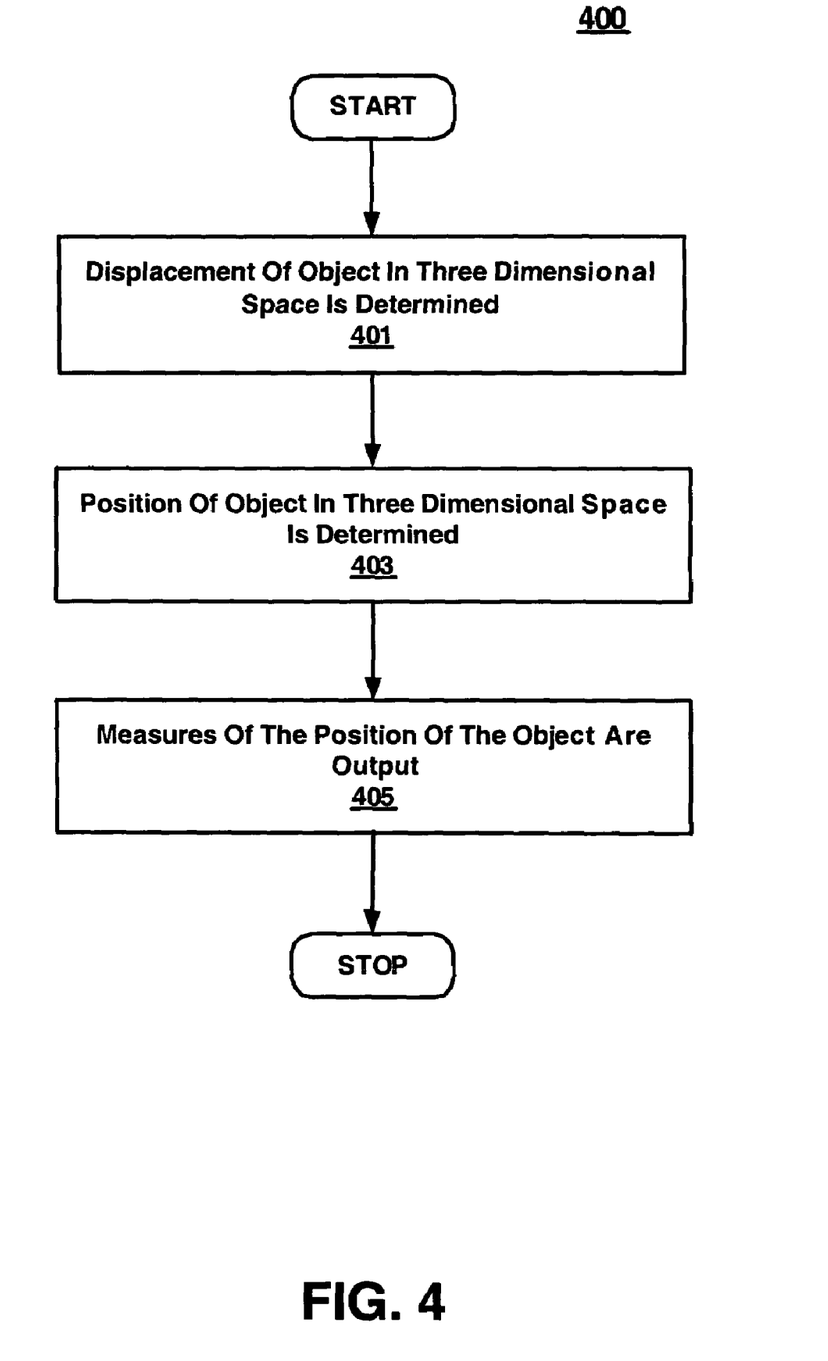
FIG. 4 shows a flowchart of a method for determining the position of an object based on the acceleration of the object according to an embodiment of the present invention.

FIG. 4 shows a flowchart 400 of a method for determining the position of a hand-held object based on the acceleration of the hand-held object according to an embodiment of the present invention.

At step 401, a measure of displacement of a hand-held object, for example, hand-held object 100 in FIG. 1 is generated. In an embodiment, the measure of displacement of the hand-held object is generated by a process that includes: (1) generating a measure of a acceleration of the hand-held, (2) integrating the measure of the acceleration of the object to produce a measure of a velocity of the hand-held object, and (3) integrating the measure of the velocity of the hand-held object to obtain a measure of the displacement of the hand-held object.

At step 403, the position of the hand-held object is determined. In an embodiment, the position of the hand-held object is determined based on a measure of a starting position of the hand-held object and a measure of the displacement of the hand-held object.

At step 405, a measure of the position of the hand-held object is output. In an embodiment, a position measure output such as position measure output 205 in FIG. 2 outputs voltages that are measures of position of a hand-held object.

Figure 5:
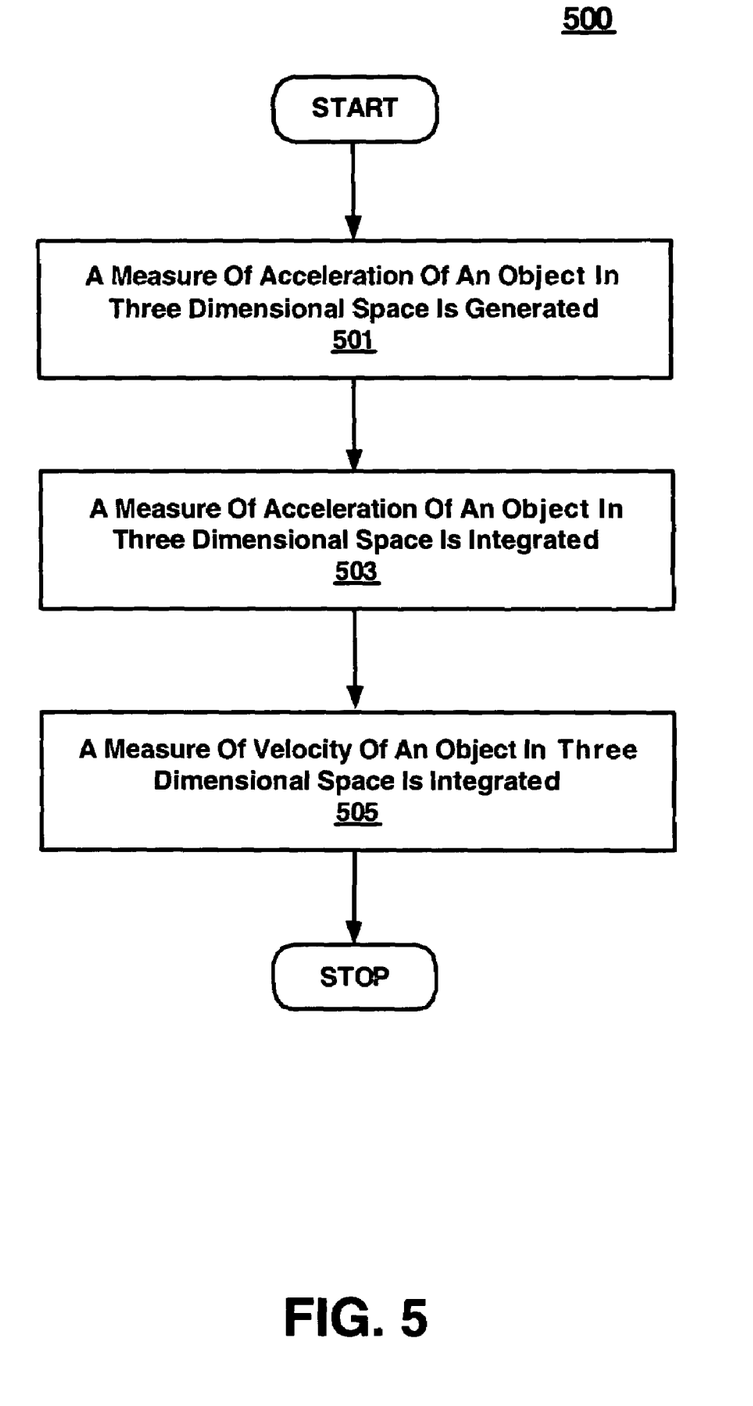
FIG. 5 shows a flowchart of a method for determining the displacement of an object based on the acceleration of the object according to an embodiment of the present invention.

FIG. 5 shows a flowchart 500 of a method for determining the displacement of a hand-held object such as hand-held object 100 in FIG. 1 based on the acceleration of the hand-held object according to an embodiment of the present invention.

At step 501, a measure of the acceleration of a hand-held object is generated.

At step 503, a measure of the acceleration of a hand-held object is integrated to produce a measure of the velocity of an object.

At step 505, a measure of the velocity of a hand-held object is integrated to obtain a measure of the displacement of the object.

As discussed herein, the herein described system for determining the position of a hand-held object, based upon the acceleration of the hand-held object, can be used in an input device such as a computer mouse. However, in contrast to the position determining mechanisms employed by the herein described embodiments, a conventional computer mouse uses a mechanical ball and rotary sensors or uses an optical pickup system to determine the mouse's position. In an embodiment of the present invention, a solid-state monolithic accelerometer can be provided that does not employ such moving parts that can require cleaning or optics that can require a special surface to operate properly.

Invention advantages include a lack of moving or mechanical parts (in some embodiments), a lack of a necessity to clean such, no requirement for a special surface, useful for signature authentication, useful for character recognition, the ability to measure accelerations in three dimensions and the fact that it can be monolithic or solid state (e.g., embodiments can use either mechanical or solid state accelerometers).

In summary, embodiments of the present invention have been explicitly described in which methods for determining the position of a hand-held object from the acceleration of the hand-held object are disclosed. A measure of the displacement of the hand-held object is generated where such measure is derived in part from a measure of an acceleration of the hand-held object. A measure of a position of the hand-held object is generated where such measure is generated based on the displacement of the hand-held object. A measure of the position of the hand-held object is output.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for determining the position of a hand-held object from the acceleration of said hand-held object, said method comprising:
   generating a measure of the displacement of said hand-held object, wherein said measure of said displacement of said hand-held object is derived in part from a measure of an acceleration of said hand-held object;
   generating a measure of a position of said hand-held object, wherein said generating said measure of said position of said hand-held object is based in part on said displacement of said hand-held object;
   outputting said measure of said position of said hand-held object, wherein said measure of said position is supplied to a hand-held object responsive application program, wherein no more than three accelerometers enable said generating of said measure of said position that enables a three dimensional on screen indicator; and
   comparing said measure of said acceleration with a second measure of second acceleration that was previously produced to enable authenticating a second signature against a first signature, wherein said first signature was created using said acceleration and said second signature was created using said second acceleration.

2. The method of claim 1 wherein said generating of said measure of said displacement of said hand-held object comprises:
   generating said measure of said acceleration of said hand-held object;
   integrating said measure of said acceleration of said hand-held object to produce a measure of a velocity of said hand-held object; and
   integrating said measure of said velocity of said hand-held object to obtain said measure of said displacement of said hand-held object.

3. The method of claim 2 wherein said generating said measure of said acceleration is performed by at least one of said accelerometers.

4. The method of claim 2 wherein said integrating said measure of acceleration and said integrating said measure of velocity is performed by an entity selected from a group consisting of software and hardware.

5. The method of claim 1 wherein said generating said measure of said displacement of said hand-held object is performed by three orthogonally oriented displacement measurement systems.

6. The method of claim 1 wherein said determining said position of said hand-held object is based on a starting position of said hand-held object.

7. The method of claim 1 wherein said measure of said displacement is derived from an output voltage proportional to the acceleration of said hand-held object.

8. The method of claim 1 wherein said measure of said position is selected from the group consisting of one, two and three-dimensional measures of said position.

9. The method of claim 1 wherein said hand-held object is selected from the group consisting of a computer mouse, a signature making instrument and an optical writing instrument.

10. The method of claim 1 wherein signature authentication is performed based on a dynamic comparison that matches shapes, accelerations, and velocities that are involved in the creation of said shapes.

11. The method of claim 1 wherein character recognition is performed based on a determination of the average acceleration and the average velocity of said hand-held object in forming a character.

12. A system for determining the position of a hand-held object, comprising:
   a displacement measure generator for generating a measure of the displacement of said hand-held object, wherein said measure of said displacement of said hand-held object is derived in part from a measure of an acceleration of said hand-held object;
   a position measure generator for generating a measure of said position of said hand-held object, wherein said measure of said position of said hand-held object is based in part on said displacement of said hand-held object and wherein no more than three accelerometers enable said generating of said measure of said position that enables a three dimensional on screen indicator;
   a position measure output for outputting said measure of said position of said hand-held object wherein said measure of said position of said hand-held object is supplied to a hand-held object responsive application; and an acceleration comparer for comparing said measure of said acceleration with a second measure of second acceleration that was previously produced to enable authenticating a second signature against a first signature, wherein said first signature was created using said acceleration and said second signature was created using said second acceleration.

13. The system of claim 12 wherein said displacement generator comprises:

an accelerometer that generates said measure of said acceleration of said hand-held object;

an integrator that integrates said measure of said acceleration of said hand-held object to produce a measure of a velocity of said hand-held object; and an integrator that integrates said measure of said velocity of said hand-held object to obtain said measure of said displacement of said hand-held object.

14. The system of claim 13 wherein said integrator that integrates said measure of acceleration and said integrator that integrates said measure of velocity are implemented by an entity selected from a group consisting of software and hardware.

15. The system of claim 13 wherein said position measure output outputs said measure of said position that is selected from the group consisting of one, two and three-dimensional measures of said position.

16. The system of claim 12 wherein said displacement generator comprises three orthogonally oriented displacement measurement systems.

17. The system of claim 12 wherein said position measure generator generates said measure of said position based on a starting position of said object.

18. The system of claim 12 wherein said displacement measure generator generates said measure of said displacement that is derived from an output voltage proportional to the acceleration of said object.

19. The system of claim 12 wherein said hand-held object is selected from the group consisting of a computer mouse, a signature making instrument and an optical pen.

20. The system of claim 12 wherein signature authentication is performed based on a dynamic comparison that matches, shapes, accelerations, and velocities that are involved in the creation of said shapes.

21. The system of claim 12 wherein character recognition is performed based on a determination of the average acceleration and the average velocity of said hand-held object in forming a character.

22. A method for determining the position of an hand-held object from an acceleration of said hand-held object, said method comprising:

producing a measure of said acceleration of said hand-held object;

integrating said measure of said acceleration of said object to produce a measure of a velocity of said hand-held object;

integrating said measure of said velocity of said object to obtain a measure of a displacement of said hand-held object;

producing a measure of a position of said hand-held object, wherein said producing of said measure of said position of said hand-held object is based on said displacement of said hand-held object;

outputting said measure of said position of said hand-held object; and comparing said measure of said acceleration with a second measure of second acceleration that was previously produced to enable authenticating a second signature against a first signature, wherein said first signature was created using said acceleration and said second signature was created using said second acceleration.

23. The method of claim 22 wherein said producing said measure of said displacement of said hand-held object is performed by three orthogonally oriented displacement measurement systems.

24. The method of claim 23 wherein said producing said measure of said acceleration is performed by an accelerometer.

25. The method of claim 23 wherein said integrating said measure of acceleration and said integrating said measure of velocity is performed by an entity selected from a group consisting of software and hardware.

26. The method of claim 22 wherein said producing said measure of said position of said hand-held object is based on a starting position of said hand-held object.

27. The method of claim 22 wherein said measure of said displacement is derived from an output voltage proportional to said acceleration of said hand-held object.

28. The method of claim 22 wherein said measure of said position is selected from the group consisting of one, two and three-dimensional measures of said position.

29. The method of claim 22 wherein said hand-held object is selected from the group consisting of a computer mouse, a signature making instrument and an optical pen.

30. The method of claim 22 wherein signature authentication is performed based on a dynamic comparison that matches, shapes, accelerations, and velocities that are involved in the creation of said shapes.

31. The method of claim 22 wherein character recognition is performed based on a determination of the average acceleration and the average velocity of said hand-held object in forming a character.

* * * * *